Figure 1:
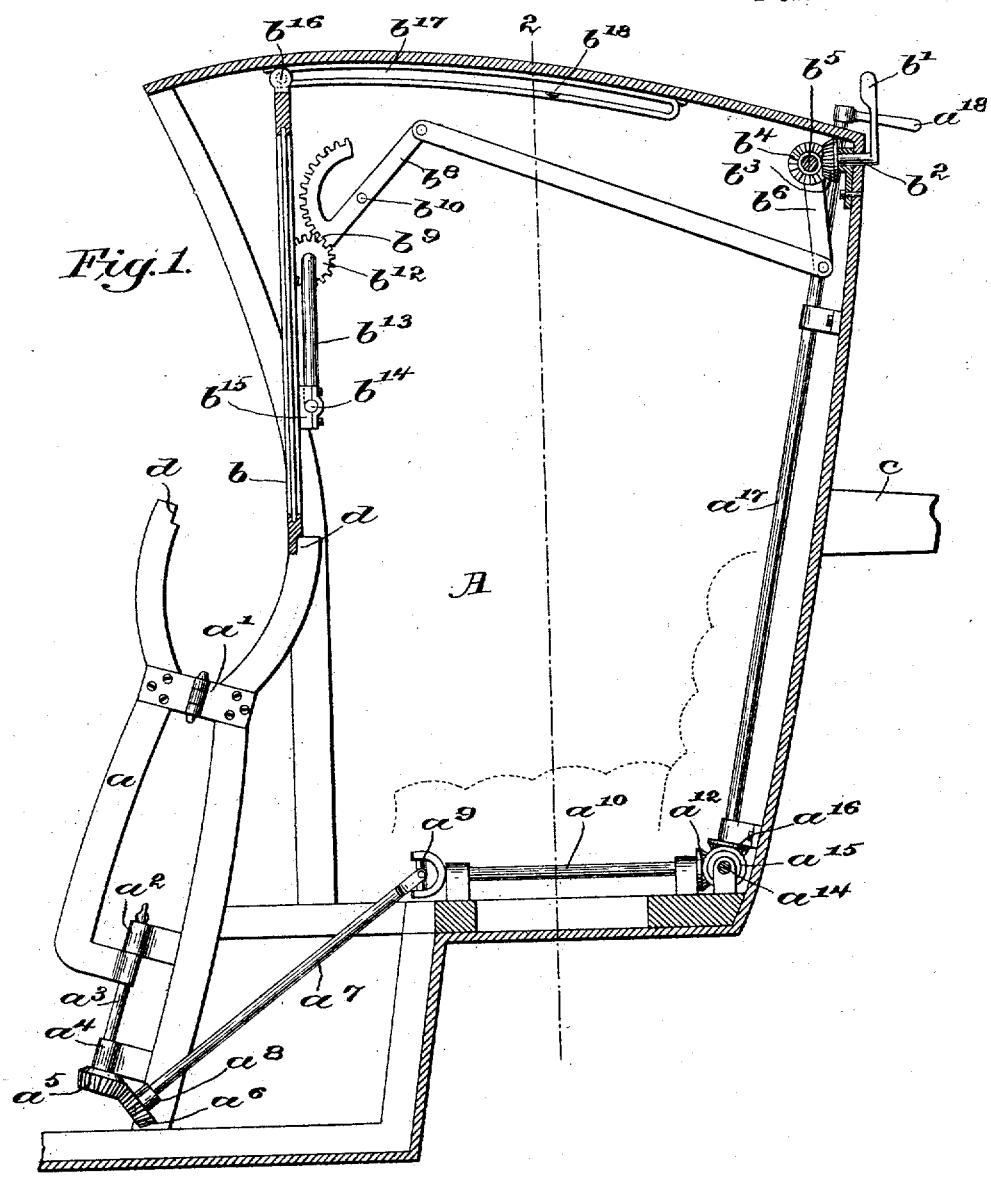

No. 11,734.

Reissued Apr. 18, 1899.

J. L. LAWRENCE.

HANSOM CAB.

(Application filed Feb. 28, 1899.)

2 Sheets—Sheet 1.

Witnesses.
Thomas J. Drummond.
Charles Fogan.

Inventor:
Joseph L. Lawrence,
by Crosby & Gregory
Attys

THE NORRIS PETERS CO., PHOTO-LITHO., WASHINGTON, D. C.

No. 11,734. Reissued Apr. 18, 1899.

J. L. LAWRENCE.

HANSOM CAB.

(Application filed Feb. 28, 1899.)

2 Sheets—Sheet 2.

Witnesses.
Thomas J. Drummond,
Charles F. Logan.

Inventor:
Joseph L. Lawrence.
by Crosby & Gregory
Atty's.

THE NORRIS PETERS CO., PHOTO-LITHO., WASHINGTON, D. C.

UNITED STATES PATENT OFFICE.

JOSEPH L. LAWRENCE, OF BOSTON, MASSACHUSETTS, ASSIGNOR OF ONE-HALF TO THE CHAUNCEY THOMAS & COMPANY, INCORPORATED, OF MAINE.

HANSOM-CAB.

SPECIFICATION forming part of Reissued Letters Patent No. 11,734, dated April 18, 1899.

Original No. 618,039, dated January 17, 1899. Application for reissue filed February 28, 1899. Serial No. 707,229.

*To all whom it may concern:*

Be it known that I, JOSEPH L. LAWRENCE, a subject of the Queen of Great Britain, residing at Boston, county of Suffolk, and State of Massachusetts, have invented an Improvement in Hansom-Cabs, of which the following description, in connection with the accompanying drawings, is a specification, like letters on the drawings representing like parts.

This invention is an improvement in hansom-cabs, and has for its leading object the provision of simple and positive mechanism for operating the doors and window which close and give access to the front of the cab, my invention being not only positive and noiseless in its action, but being also not liable to get out of order. In my application, Serial No. 611,385, dated September 27, 1898, I have disclosed a mechanism which although satisfactory from many standpoints yet occupies too much space and at the same time is exposed to view and interference more than is desirable, my said previous invention, moreover, making use of and displaying certain operating-straps, which rapidly deteriorate, are obnoxious to the view, and, moreover, require both hands of the driver in their manipulation. Accordingly I have devised the hereindescribed invention, in which the window is operated positively by a simple movement of of a single hand-lever to the right or left, as required, all the operating connections between said lever and the window being entirely concealed beneath the cab-lining in the framework of the vehicle, and in which the doors are also opened and closed by a single hand-lever, whose connections are likewise entirely concealed, the doors not even having any levers or special devices in view, but being simply provided at their lower ends with an elongated pintle or rod, which carries a bevel-gear in mesh with a pinion at the adjacent end of a rod connected by a universal joint with other rods and gearing leading to the driver's lever.

My invention in its details of construction and operation will be more particularly set forth in the following description, and the invention will be further defined in the appended claims.

Figure 2:
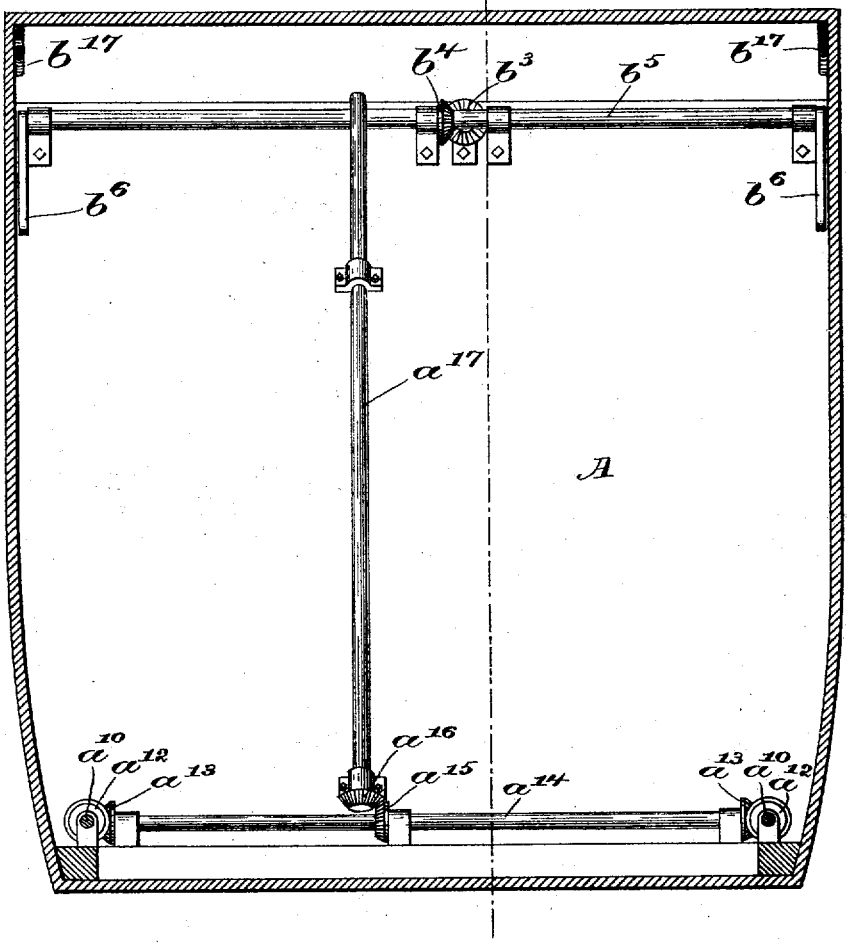
Figure 3:
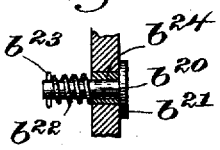

In the drawings, in which I have shown my invention in its preferred embodiments, Figure 1 is a vertical longitudinal section through a cab, showing the various details of my invention, mainly in side elevation. Fig. 2 is a vertical transverse section taken on the line 2, Fig. 1; and Fig. 3 is a sectional detail of a stop, to be described.

The cab has a body A, with doors $a$ and window $b$, all of usual or preferred construction, a usual driver's seat being provided at the rear, where it is shown broken off at $c$, the steps and dashboard at the front of the vehicle being also herein omitted in order to present the device in more enlarged detail.

The doors $a$ are properly hinged to the body of the cab by suitable hinges $a'$ $a^2$, the latter having, as herein shown, an elongated pintle $a^3$, in the form of a strong rod extending downward beneath the floor of the vehicle and having, below a journal bearing or bracket $a^4$, a miter-gear $a^5$ fixed thereon. In mesh with this gear is a pinion $a^6$, fast on a rod $a^7$, having a bearing $a^8$ at its forward end and connected by means of a gimbal or other universal joint $a^9$ at its rear end to a rod $a^{10}$, journaled, preferably, beneath the seat of the vehicle. The rod $a^{10}$ is provided at its rear end with a miter-gear $a^{12}$, meshing with a correspondingly-beveled gear $a^{13}$ of a horizontal shaft $a^{14}$, which extends across the vehicle, at the rear side thereof, it being understood that corresponding parts are provided for each door and connect with the shaft $a^{14}$ at its opposite ends in order that the doors may be simultaneously operated. The shaft $a^{14}$ carries an intermediate gear $a^{15}$, meshing with a pinion $a^{16}$ of an operating-shaft $a^{17}$, which extends in front of the driver, where it is provided with a hand-lever $a^{18}$, so that the driver simply by turning this handle one way or the other can positively move the doors $a$ precisely as desired.

Adjacent the hand-lever $a^{18}$ is a second hand-lever $b'$, which, however, is preferably journaled to move in a vertical instead of in a horizontal plane, as the lever $a^{18}$. The lever $b'$ is fast on a stub-shaft $b^2$, extending just through the wall of the cab, where it is provided with a beveled gear $b^3$, in mesh with a corresponding gear $b^4$ of a rock-shaft $b^5$, provided at each end with a rocker-arm $b^6$, connected by a pivoted link $b^7$ to the free end $b^8$ of a segmental gear $b^9$, pivoted at $b^{10}$ to the side of the cab and meshing with a spur-pinion $b^{12}$, journaled in the side of the cab and having its axle provided at its inner end with a crank-arm $b^{13}$, pivotally connected at $b^{14}$ with a bracket $b^{15}$, secured at the rear side or end of the window $b$, there being preferably the same mechanism as described for each end of the window.

At its upper edge the window $b$ is provided at each end with a grooved roller $b^{16}$, which travels in a slotway or track $b^{17}$, herein shown as composed of a rod $b^{18}$, bent around parallel to itself (see Fig. 1) and covered with leather to constitute a noiseless track.

The window and doors at their meeting ends are rabbeted, as indicated at $d$, in order that they may interlock in usual manner.

It is often desirable to hold the window partly open, slanting outward toward its lower end, and accordingly I provide a stop, (see Fig. 1 and shown in enlarged detail in Fig. 3,) so that when the lever $b'$ is turned sufficiently merely to tip the window forward as desired the stop may be engaged with the lever $b'$ to hold it. Said stop comprises a plunger $b^{20}$, having an enlarged or flanged head $b^{21}$ and held normally inward by a spring $b^{22}$, as shown in Fig. 3, said spring bearing against a pin or other hold $b^{23}$ at one end and at its other end against a shoulder or flange $b^{24}$, so that the moment the lever $b'$ is moved out from under the engaging lip or flange of the head of the plunger the latter flies against the back of the cab out of the way of the lever. This feature is of particular advantage, in connection with the positive mechanism already described, for adjusting the window, as, supposing it is raining and yet the weather is sufficiently close to require that the window be partly open, this arrangement permits the window to be thrown out at its lower end enough to admit the required amount of air, while at the same time shedding the rain, and yet because of the holding mechanism the window cannot possibly jar or rattle.

In operation when a passenger is to be admitted or wishes to get out, it being supposed that the doors and window are closed, the driver, still holding the reins in his right hand, as usual, grasps the handle $b'$ with his left hand and turns the lever slightly to the right, thereby rocking the rock-shaft $b^5$ and cranks $b^6$ forward, so as to swing the segmental gears $b^9$ to the rear and correspondingly rotate the pinions $b^{12}$, whose arms $b^{13}$ positively swing the window outwardly at its lower edge and compel the upper edge thereof to move backwardly beneath the top of the cab under the guidance of its rollers $b^{16}$. It will be observed that the pivot $b^{14}$ is near the lower edge of the window, and accordingly when the window is in its open position, with its lower edge then extending forward just under the front edge of the cab, it will be apparent that the window will be held in its raised position by its own gravity, the arms $b^{13}$ being then in an approximately vertical position. Having raised the window, the driver thereupon turns the handle $a^{18}$ also to the right, thereby through the rotation of the operating-shaft $a^{17}$ rocking the shaft $a^{14}$ over rearwardly, and thereby through the rods $a^{10}$ $a^7$ turning the gears $a^6$ and $a^5$, so as to rotate the rods $a^3$ and open the doors.

It is of great advantage to operate the doors by means of positively-connected gearing and shafts, especially when all the parts are concealed, and this is also an important advantage of the window-operating mechanism, inasmuch as there are no parts which can possibly become slack or liable to rattle, and all the power-transmitting mechanism is entirely concealed from view and no parts are liable to discommode the occupants of the vehicle.

My invention provides mechanism which is permanent in character and not liable to get out of order, being also relatively inexpensive.

Having fully described my invention, what I claim, and desire to secure by Letters Patent, is—

1. In a hansom-cab, a door, a rod fixed to said door in alinement with the hinge-pintle thereof, said rod extending downwardly from the lower end of the door and having fixed at its lower end a gear, a transverse shaft journaled in the bottom of the body at the rear thereof, said shaft having a bevel-gear thereon, a rod extending forward from said last-mentioned gear, and a second rod extending rearward from said first-mentioned gear, said rods being connected by a universal joint and having at their free ends beveled gears meshing respectively with said two previously-mentioned gears, and a shaft extending vertically at the rear of the cab-body to the driver's seat and carrying a gear in mesh with a gear on said transverse shaft, substantially as described.

2. In a hansom-cab, a pair of doors, a transverse shaft journaled at the rear in the bottom of the cab-body, said shaft having adjacent its opposite ends bevel-gears, said doors each carrying a fixed rod in alinement with the lower hinge-pintle of its door, said rods having at their lower ends gears, and rod connections between each of the door-gears and said transverse shaft, said rod connections having at their opposite ends gears in mesh respectively with the end gears of the transverse shaft and with said door-gears, and a single shaft extending upwardly at the back of the cab to the driver's seat, said shaft having at its lower end a bevel-gear, and said transverse shaft having an adjacent beveled gear in mesh therewith, substantially as described.

3. In a hansom-cab, a pair of doors, a rod fixed to each door in alinement with the hinge-pintle thereof, said rods each extending downwardly from the lower end of its door and provided at its lower end with a gear, an operating-shaft extending downwardly from adjacent the driver's seat, said shaft being provided at its lower end with a gear, bevel-gears in mesh with the gears of the rods fixed to the doors, and rod connections connected angularly for operating said bevel-gears from said gear on the operating-shaft, substantially as described.

4. In a hansom-cab, a window for closing the front of the cab, arms pivotally supporting said window at its opposite ends, a pinion fixed to one of said arms, a segmental gear pivoted to the side of the cab and in mesh with said pinion, a rock-shaft and rocker-arm at the rear of the cab and pivotally connected to said segmental gear by a link, and means for rocking said rock-shaft, substantially as described.

5. In a hansom-cab, a window for closing the front of the cab, arms pivotally supporting said window at its opposite ends, a pinion fixed to one of said arms, a segmental gear pivoted to the side of the cab and in mesh with said pinion, a rock-shaft and rocker-arm at the rear of the cab and pivotally connected to said segmental gear by a link, a stub-shaft and hand-lever, said shaft being geared to said rock-shaft for operating the latter, substantially as described.

6. In a hansom-cab, a window for closing the front of the cab, means between the window and the driver's seat for operating said window, said means including a shaft and hand-lever, combined with a stop for locking said lever in an intermediate position for holding the window partly open, substantially as described.

In testimony whereof I have signed my name to this specification in the presence of two subscribing witnesses.

JOSEPH L. LAWRENCE.

Witnesses:
GEO. W. GREGORY,
G. H. MAXWELL.